United States Patent

Griessmann et al.

[11] Patent Number: 5,970,799
[45] Date of Patent: Oct. 26, 1999

[54] ELECTROMAGNETIC FLOW PROBE

[75] Inventors: Marcel Griessmann, Cernay, France; Frank Ohle, Steinen, Germany

[73] Assignee: Endress + Hauser Flowtec AG, Reinach, Switzerland

[21] Appl. No.: 09/114,730

[22] Filed: Jul. 13, 1998

Related U.S. Application Data

[60] Provisional application No. 60/057,618, Sep. 4, 1997.

[30] Foreign Application Priority Data

Jul. 17, 1997 [EP] European Pat. Off. ............ 97 11 2311

[51] Int. Cl.⁶ ........................................................ G01F 1/58
[52] U.S. Cl. ........................................................ 73/861.12
[58] Field of Search ............................ 73/861.08, 861.12; 128/204.23, 204.21, 204.22, 204.25

[56] References Cited

U.S. PATENT DOCUMENTS

| | | |
|---|---|---|
| 3,529,591 | 9/1970 | Schuette . |
| 3,693,439 | 9/1972 | Cushing . |
| 3,881,350 | 5/1975 | Nosley . |
| 4,000,648 | 1/1977 | Olson . |

FOREIGN PATENT DOCUMENTS

WO 96/18086  6/1996  WIPO .

*Primary Examiner*—Richard Chilcot
*Assistant Examiner*—Jewel Thompson
*Attorney, Agent, or Firm*—Bose McKinney & Evans

[57] ABSTRACT

To improve both the absolute measurement accuracy and the linearity of the characteristic function and the short-time repeatability of measurements at varying flow velocities, particularly at low flow rates, this electromagnetic flow probe (10) is designed to be immersed in a fluid flowing in a pipe (12), which is to be measured, the direction of immersion being virtually perpendicular to the direction of fluid flow. The probe is further designed to be passed through a hole in a wall of the pipe fluid-tight and comprises a circular cylindrical housing (11) having a predetermined outside diameter adapted to the bore. The front end (14) of the housing extends into the fluid and is closed fluid-tight by a front plate (14") of insulating material in the form of a calotte, which has a radius approximately equal to 1.2 to 1.5 times the outside diameter of the housing. A coil assembly (15) is disposed in the housing for establishing a magnetic field (16) extending through the front plate (14") into the fluid. A coil core (17') is disposed in the housing and made at least partially of soft magnetic material which ends at or near the front plate. A first galvanic electrode (18) and a second galvanic electrode (19) are disposed in the front plate on one of the meridians of the calotte and symmetrically with respect to a vertex of the meridian.

6 Claims, 2 Drawing Sheets

ELECTROMAGNETIC FLOW PROBE

This application claims benefit of provisional application 60/057,618 filed Sep. 4, 1997.

FIELD OF THE INVENTION

This invention relates to the provision of an electromagnetic flow probe designed to be immersed in a fluid flowing in a pipe, which is to be measured, the direction of immersion being virtually perpendicular to the direction of fluid flow, and to be passed through a bore in a wall of the pipe fluid-tight.

BACKGROUND OF THE INVENTION

With such flow probes which can be inserted into the bore by means of, for example, an adapter provided therein, the velocity and, after suitable calibration, the volumetric flow rate of the fluid can be measured.

Unlike electromagnetic flow sensors, in which a coil assembly for producing a magnetic field passing through a measuring tube is fixed on the external surface of this measuring tube and in which at least two electrodes are provided in the wall of this tube, the electromagnetic flow probes according to the invention are inserted into a lateral bore of the measuring tube, for example, and fixed in the bore fluid-tight.

The need for the coil assembly on the external surface of the measuring tube is eliminated since the magnetic field exists only in the area of the front end of the probe, which extends into the fluid, or is produced in this area by a current flowing through the coil assembly.

U.S. Pat. No. 3,881,350 discloses an electromagnetic flow probe designed to be immersed in deep-sea water, i.e., in water under high pressures, which flows relative to the flow probe, the flow probe comprising:
- a circular cylindrical housing having an outside diameter and a front end
  - which is closed fluid-tight with a flat front plate of insulating material (this front plate referred to therein as "insulating wall"), and
  - which is surrounded by a lenticular bead (referred to therein as "head");
- a coil assembly disposed in the housing for producing a magnetic field extending through the front plate into the fluid;
- a coil core disposed in the housing and made at least partially of soft magnetic material
  - which ends at or near the front plate; and
- a first galvanic electrode and a second galvanic electrode disposed in the front plate on one of the diameters of the front plate and symmetrically with respect to the center of the diameter.

It is obvious that because of the bead, this flow probe is not readily insertable into the bore of a pipe wall from outside fluid-tight. In the case of measuring tubes, however, but particularly in the case of installed pipes, this insertability from outside is mandatory. Thus, if the prior-art flow probe is used in a measuring tube and/or a pipe, its bead must be omitted.

Then, however, the front end of the electromagnetic flow probe terminates with the flat front plate, which must contain the electrodes. Since the fluid flows against the front end, vortices similar to those formed in vortex flow sensors are caused downstream of the front end.

SUMMARY OF THE INVENTION

The starting point for the invention were investigations by the inventors regarding the question as to why the measurement accuracy of electromagnetic flow probes with a flat plate at the front end is highly unsatisfactory at low flow velocities and/or at low flow rates.

These investigations showed that the aforementioned vortices disturb the flow conditions in the area of the electrodes as a function of flow velocity; in any case, measurement accuracy at varying flow velocities is not constant, but nonlinear.

The invention therefore serves to improve both the absolute measurement accuracy and the linearity of the characteristic function and the short-time repeatability of measurements at varying flow velocities, particularly at low flow rates. "Characteristic function" as used herein means the dependence of measurement accuracy on flow rate or on flow velocity.

To solve the problems shown, the invention provides an electromagnetic flow probe
- which is designed to be immersed in a fluid flowing in a pipe, which is to be measured, the direction of immersion being virtually perpendicular to the direction of fluid flow,
- which is designed to be passed through a hole in a wall of the pipe fluid-tight, and
- which comprises:
  - a circular cylindrical housing having a predetermined outside diameter adapted to the bore,
    - the front end of the housing, which extends into the fluid, being closed fluid-tight by a front plate of insulating material in the form of a calotte,
      - which has a radius approximately equal to 1.2 to 1.5 times the outside diameter of the housing;
  - a coil assembly disposed in the housing for establishing a magnetic field extending through the front plate into the fluid;
  - a coil core disposed in the housing and made at least partially of soft magnetic material
    - which ends at or near the front plate; and
  - a first galvanic electrode and a second galvanic electrode which are disposed in the front plate on one of the meridians of the calotte and symmetrically with respect to a vertex of the meridian.

As a result of the calotte-shaped design of the front plate, the flow begins to shed and form vortices only after the electrodes, so that the electrodes are not affected by disturbances, particularly by these vortices. Thus, measurement accuracy and the linearity of the characteristic function are greatly improved.

BRIEF DESCRIPTION OF THE DRAWINGS

The invention will become more apparent from the following description of an embodiment taken in conjunction with the accompanying drawing, in which like parts are designated by like reference characters, and in which.

DETAILED DESCRIPTION OF THE INVENTION

Figure 1:
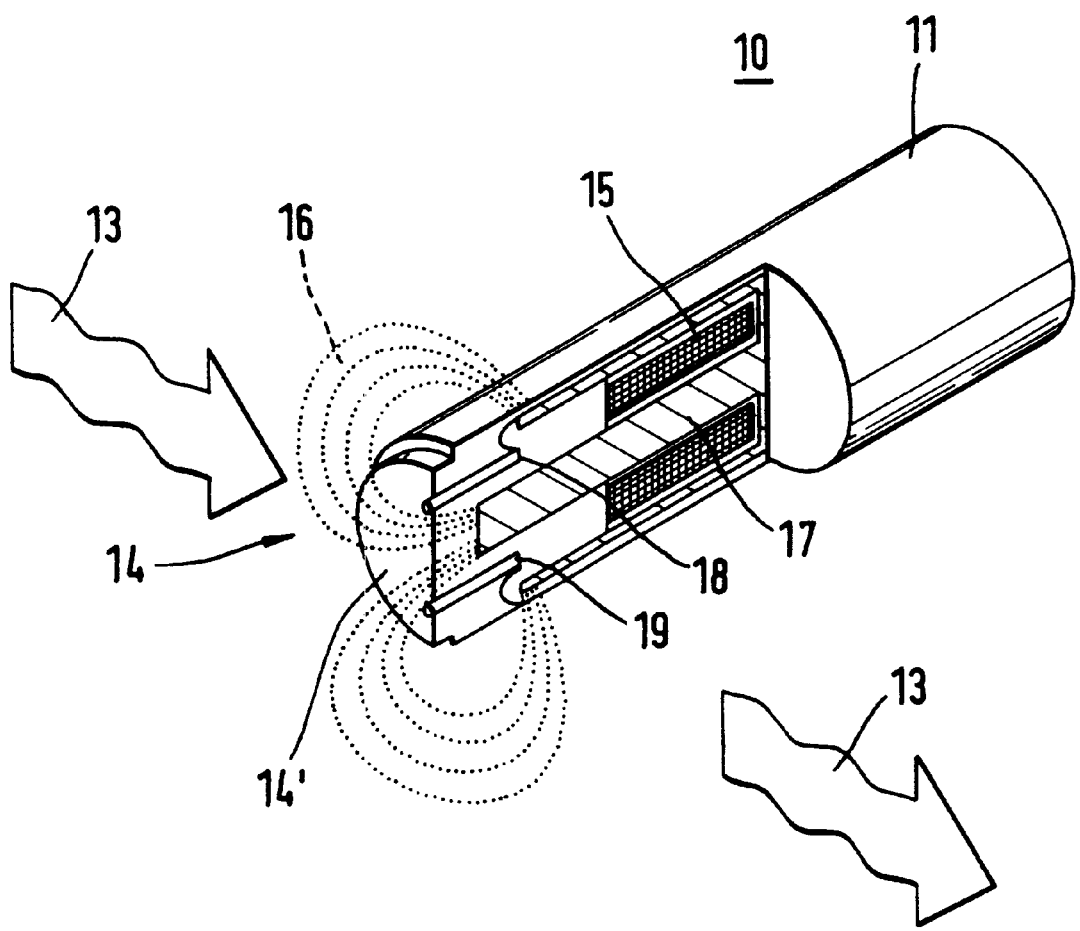
FIG. 1 is a perspective and partially sectioned representation of the measuring principle underlying the invention.

First, the measuring principle underlying the invention will be explained with the aid of the perspective and partially sectioned representation of FIG. 1.

A flow probe 10 comprises a generally circular cylindrical housing 11 having a predetermined outside diameter. This outside diameter is adapted to the diameter of a bore which is provided in a wall of a pipe not shown in FIG. 1, but shown in FIG. 2, and into which the flow probe was inserted fluid-tight. Pipe 12 conducts a fluid to be measured, in which the flow probe is immersed in a direction virtually perpendicular to the direction of fluid flow, which is indicated by wavy arrows 13.

A front end 14 of housing 11, which extends into the fluid, is closed fluid-tight by a flat front plate 14' of insulating material. By means of a coil assembly 15 disposed in the housing, a magnetic field 16 extending through front plate 14' into the fluid can be produced. A coil core 17 disposed in housing 11 and made at least partially of soft magnetic material ends at or near front plate 14'.

A first galvanic electrode 18 and a second galvanic electrode 19 are disposed in front plate 14' and are thus in contact with the fluid. A voltage induced according to Faraday's law of induction can be taken between electrodes 18, 19.

Figure 2:
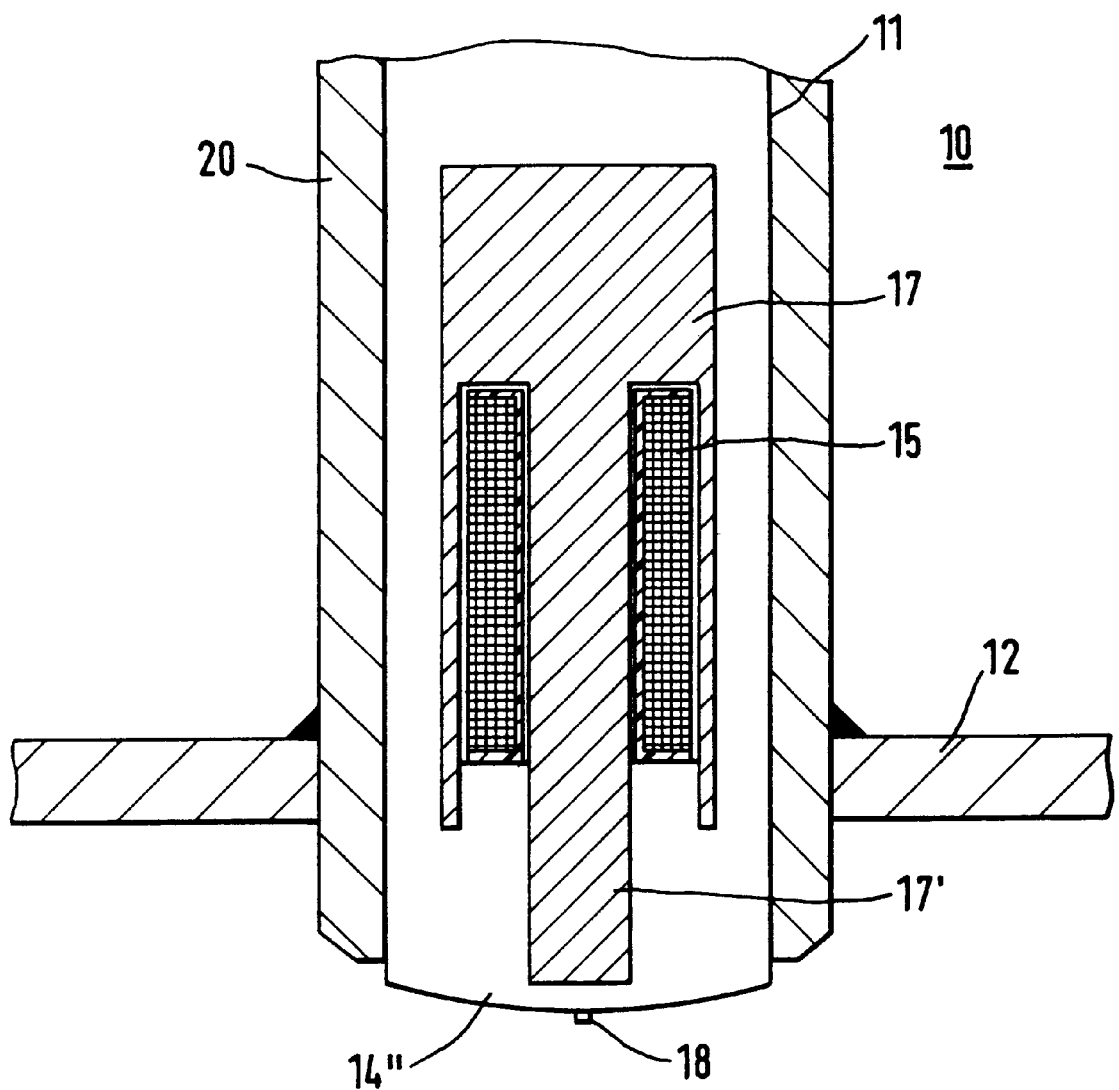
FIG. 2 is a cross-sectional view of a flow probe according to the invention.

In the embodiment of FIG. 2, the flow probe is shown in across-sectional view. The flow probe is fixed in pipe 12 fluid-tight by means of an adapter 20 which was set in the wall of the pipe and, for example, welded to it.

This construction is particularly advantageous in that first, adapter 20 can be set and fixed in pipe 12 and that flow probe 10 needs to be inserted into adapter 20 and fixed therein only after that.

According to the invention, front end 14 of housing 11, which extends into the fluid, is closed fluid-tight with a front plate 14" of insulating material which has the form of a calotte. The radius of the calotte is approximately equal to 1.2 to 1.5 times the outside diameter of housing 11.

The first and second galvanic electrodes, of which only the first electrode 18 can be seen in FIG. 2, are located on one of the meridians of the calotte symmetrically with respect to a vertex of this meridian.

If the axis of pipe 12 is virtually perpendicular to the plane of this meridian, as was assumed for the representation of FIG. 2, the fluid will flow virtually perpendicularly to this plane. Since, as was explained above, the flow sheds and forms vortices only after the electrodes, the flow at the electrodes is disturbance-free.

We claim:

1. An electromagnetic flow probe which is designed to be immersed in a fluid flowing in a pipe, which is to be measured, the direction of immersion being virtually perpendicular to the direction of fluid flow, which is designed to be passed through a bore in a wall of the pipe fluid-tight, and which comprises:

a circular cylindrical housing having a predetermined outside diameter adapted to the bore, the front end of the housing, which extends into the fluid, being closed fluid-tight by a front plate of insulating material in the form of a calotte, the calotte having a radius approximately equal to 1.2 to 1.5 times the outside diameter of the housing;

a coil assembly disposed in the housing for establishing a magnetic field extending through the front plate into the fluid;

a coil core disposed in the housing and made at least partially of soft magnetic material which ends at or near the front plate; and a first galvanic electrode and a second galvanic electrode which are disposed in the front plate on one of the meridians of the calotte and symmetrically with respect to a vertex of the meridian.

2. An electromagnetic flow probe comprising:

a cylindrical housing having a predetermined outside diameter and a front end, the front end of the housing being closed fluid-tight by a front plate of insulating material in the form of a calotte, a coil assembly disposed in the housing for establishing a magnetic field extending through the front plate of the housing;

a first galvanic electrode and a second galvanic electrode which are disposed in the front plate on a meridian of the calotte and symmetrically with respect to a vertex of the meridian.

3. The electromagnetic flow probe of claim 2, wherein the calotte has a radius greater than the outside diameter of the housing.

4. The electromagnetic flow probe of claim 3, wherein the radius of the calotte is approximately equal to 1.2 to 1.5 times the outside diameter of the housing.

5. The electromagnetic flow probe of claim 2, wherein the electromagnetic flow probe is designed to be immersed in a fluid flowing in a pipe, the direction of immersion being virtually perpendicular to the direction of fluid flow.

6. The electromagnetic flow probe of claim 5, wherein the pipe has a bore in the wall, the housing of the electromagnetic flow probe being designed to be passed through the bore.

* * * * *

UNITED STATES PATENT AND TRADEMARK OFFICE
CERTIFICATE OF CORRECTION

PATENT NO. : 5,970,799                                                  Page 1 of 2
DATED : October 26, 1999
INVENTOR(S) : Marcel Griessmann and Frank Ohle It is certified that error appears in the above-identified patent and that said Letters Patent is hereby corrected as shown below:

On the title page, item [63]: The following references should be inserted

| | | |
|---|---|---|
| 2,637,206 | 5/5/1953 | Atkins Jr. |
| 3,668,931 | 6/13/1972 | Zanker et al. |
| 3,838,683 | 10/1/1974 | Kolin |
| 4,009,603 | 3/1/1977 | Molny |
| 4,122,714 | 10/31/1978 | Kobaysjhi et al. |
| 4,125,019 | 11/14/1978 | Cushing |
| 4,175,566 | 11/27/1979 | Millar |
| 4,322,982 | 4/6/1982 | Muller et al. |
| 4,389,898 | 6/28/1983 | Long et al. |
| 4,554,828 | 11/26/1985 | Doll |
| 3,503,258 | 3/31/1970 | Baker |
| 3,319,807 | 12/1984 | DT |
| 1,144,057 | 3/1985 | SU |
| 0,905,864 | 2/1982 | SU |
| 442,726 | 12/1969 | SU |

UNITED STATES PATENT AND TRADEMARK OFFICE
CERTIFICATE OF CORRECTION

PATENT NO. : 5,970,799
DATED : October 26, 1999
INVENTOR(S) : Marcel Griessmann and Frank Ohle It is certified that error appears in the above-identified patent and that said Letters Patent is hereby corrected as shown below:

Other References

Rolff, Jacob and Strohrmann, Gunther, "Sensoren-MID Sensor Magmeter", 8130ZTP AutomatisierungetechischePraxis, 35 (1993) July, No. 7, Munchen, Germany, pp. 421-423 (With English-Language Abstract)

Signed and Sealed this

Twenty-fifth Day of July, 2000

Attest:

Q. TODD DICKINSON

Attesting Officer

Director of Patents and Trademarks